(12) United States Patent
Tano et al.

(10) Patent No.: US 6,882,517 B2
(45) Date of Patent: Apr. 19, 2005

(54) RAW MATERIAL COMPOSITE FOR CARBON MATERIAL USED IN ELECTRIC DOUBLE LAYER CAPACITOR, MANUFACTURING METHOD OF THE SAME, ELECTRIC DOUBLE LAYER CAPACITOR, AND MANUFACTURING METHOD OF THE SAME

(75) Inventors: Tamotsu Tano, Yamaguchi (JP); Takashi Oyama, Yamaguchi (JP); Akinori Mogami, Akishima (JP); Makoto Takeuchi, Akishima (JP); Hiroshi Kobayashi, Tokyo (JP); Yukinori Kude, Yokohama (JP)

(73) Assignees: Nippon Oil Corporation, Tokyo (JP); JEOL Ltd., Tokyo (JP); Nippon Petroleum Refining Co., Ltd., Tokyo (JP)

( * ) Notice: Subject to any disclaimer, the term of this patent is extended or adjusted under 35 U.S.C. 154(b) by 0 days.

(21) Appl. No.: 10/724,229

(22) Filed: Dec. 1, 2003

(65) Prior Publication Data

US 2004/0131860 A1 Jul. 8, 2004

Related U.S. Application Data

(63) Continuation-in-part of application No. PCT/JP02/05292, filed on May 30, 2002.

(30) Foreign Application Priority Data

May 31, 2001 (JP) .................................... P2001-165249
Dec. 28, 2001 (JP) .................................... P2001-399803

(51) Int. Cl.[7] ................................................ H01G 9/00
(52) U.S. Cl. ..................... 361/502; 361/503; 361/504; 361/508; 361/512; 361/516

(58) Field of Search .................................. 361/502, 503, 361/504, 507, 508, 509, 512, 516, 519, 520, 523, 525, 528, 529

(56) References Cited

U.S. PATENT DOCUMENTS

| 5,690,901 A | * | 11/1997 | Zhang et al. ............. 423/449.6 |
| 5,786,555 A | * | 7/1998 | Saito et al. ................. 204/294 |
| 6,205,016 B1 | * | 3/2001 | Niu ............................. 361/503 |
| 6,487,066 B1 | * | 11/2002 | Niiori et al. ................ 361/502 |
| 6,665,169 B1 | * | 12/2003 | Tennent et al. ............. 361/303 |

FOREIGN PATENT DOCUMENTS

| JP | 11-054384 | 2/1999 |
| JP | 11-31733 | 11/1999 |
| JP | 2000-077273 | 3/2000 |
| JP | 2001-180923 | 7/2001 |

OTHER PUBLICATIONS

International Preliminary Examination Report of PCT/JP02/05292, dated Jul. 22, 2003.

* cited by examiner

*Primary Examiner*—Dean A. Reichard
*Assistant Examiner*—Nguyen T. Ha
(74) *Attorney, Agent, or Firm*—Finnegan, Henderson, Farabow, Garrett & Dunner, LLP

(57) ABSTRACT

A raw material composite 10 for a carbon material used in an electric double layer capacitor contains microcrystalline carbon having a layered crystal structure similar to graphite, and is formed a carbon material for an electric double layer capacitor by undergoing an activation treatment. Here, the raw material composite is characterized in that a Hardgrove grindability index HGI defined by ASTMD-409-71 is 50 or above, an interlayer distance $d_{002}$ of the microcrystalline carbon determined by an X-ray diffraction method is 0.343 NM or below, and a crystallite size $Lc_{002}$ of the microcrystalline carbon determined by the X-ray diffraction method is 3.0 nm or below.

10 Claims, 1 Drawing Sheet

RAW MATERIAL COMPOSITE FOR CARBON MATERIAL USED IN ELECTRIC DOUBLE LAYER CAPACITOR, MANUFACTURING METHOD OF THE SAME, ELECTRIC DOUBLE LAYER CAPACITOR, AND MANUFACTURING METHOD OF THE SAME

RELATED APPLICATIONS

This is a Continuation-In-Part application of International Patent Application Ser. No. PCT/JP02/05292 filed on May 30, 2002.

BACKGROUND OF THE INVENTION

1. Field of the Invention

The present invention relates to a raw material composite for a carbon material used in an electric double layer capacitor and a manufacturing method of the same, and to an electric double layer capacitor and a manufacturing method of the same.

2. Related Background Art

In the past, based on a concept that a capacitance of an electric double layer capacitor is approximately in proportion to the surface area of polarizable electrodes (such as carbon electrodes) configured as an anode and a cathode constituting the electric double layer capacitor, various considerations have been made to increase the surface area of a carbon material for the carbon electrodes in order to increase the capacitance thereof when using the carbon electrodes as the polarizable electrodes.

For example, activated carbon has been heretofore used as the carbon material for the carbon electrodes. A method including the steps of carbonizing a raw material for the carbon material (hereinafter referred to as "raw material carbon") at a temperature of 600° C. or below, and then subjecting a carbonized intermediate product thus obtained (hereinafter referred to as a "raw material composite") to an activation treatment, has been known as a method for increasing the specific surface area of this activated carbon.

As for this activation treatment, there are known a method of heating the raw material composite in a temperature range from 600° C. to 1000° C. in a water vapor or carbon dioxide atmosphere or a method of mixing zinc chloride, potassium hydroxide or the like with the raw material composite and then heating in an inert gas atmosphere, and the like. In the course of this activation treatment, numerous pores suitable for absorption are formed on the surface of the material to constitute the activated carbon, and the specific surface area of the activated carbon is resultantly increased. The specific surface area of the activated carbon thus manufactured accounts for a range from 1000 to 2500 $m^2/g$ or thereabouts, for example, when measured by the nitrogen gas absorption method (the BET method).

SUMMARY OF THE INVENTION

However, the method of increasing the capacitance of the electric double layer capacitor by increasing the surface area of the carbon material for the carbon electrodes constituting the electric double layer capacitor has limitations. One large factor is a decrease in the surface area per unit volume of the raw material composite which is caused by subjecting the raw material composite to the activation treatment as described above.

On the contrary, Japanese Unexamined Patent Publication No. H11(1999)-317333 discloses a carbon material for an electric double layer condenser (an electric double layer capacitor) and an electric double layer condenser (an electric double layer capacitor), which can improve capacitance by about 40% as compared to capacitance of a conventional electric double layer capacitor in spite of the small specific surface area to be determined by the nitrogen gas absorption method, by using a carbon material for a carbon electrode containing microcrystalline carbon having a layered crystal structure with an interlayer distance $d_{002}$ in a range from 0.365 to 0.385 nm.

However, the inventors of the present invention found out that the electric double layer condenser (the electric double layer capacitor) disclosed in Japanese Unexamined Patent Publication No. H11(1999)-317333 was still insufficient because adequate capacitance and energy density were not obtained.

The present invention has been made in view of the above-described problems of the prior art. In it an object of the present invention to provide a raw material composite for a carbon material used in an electric double layer capacitor which can surely improve capacitance and energy density of the electric double layer capacitor, a manufacturing method of the same, an electric double layer capacitor having high capacitance and energy density, and a manufacturing method of the same.

As a result of extensive studies to attain the object, the inventors of the present invention have found out that it is possible to sufficiently and surely improve capacitance and energy density of an electric double layer capacitor including a carbon electrode manufactured from a carbon material obtained after an activation treatment of a raw material composite, by means of regulating a structure and physical properties of the raw material composite which is a substance in a state before the activation treatment of the carbon material being a constituent material for the carbon electrode. Thus the inventors have attained the present invention.

Specifically, the present invention provides a raw material composite for a carbon material used in an electric double layer capacitor containing microcrystalline carbon having a layered crystal structure similar to graphite, which is formed into the carbon material for an electric double layer capacitor by undergoing an activation treatment, in which a Hardgrove grindability index HGI defined by ASTMD-409-71 is 50 or above, an interlayer distance $d_{002}$ of the microcrystalline carbon determined by an X-ray diffraction method is 0.343 nm or below, and a crystallite size $Lc_{002}$ of the microcrystalline carbon determined by the X-ray diffraction method is 3.0 nm or below.

According to the raw material composite of the present invention having the defined structure and the physical properties which simultaneously satisfy the condition of the Hardgrove grindability index HGI defined by ASTMD-409-71, the condition of the interlayer distance $d_{002}$ of the microcrystalline carbon, and the condition of the crystallite size $Lc_{002}$ of the microcrystalline carbon, it is possible to manufacture the carbon material easily, surely and at high reproducibility which satisfies a condition of a specific surface area (300 $m^2/g$ or below) to be determined by a nitrogen gas absorption method to be discussed later, and the condition of the interlayer distance $d_{002}$ (0.360 to 0.380 nm) of the microcrystalline carbon simultaneously.

When this carbon material is used as the constituent material for the carbon electrode, a plurality of carbon layer planes in the microcrystalline carbon effectively function as interfaces to be formed on electric double layers. As a result, by providing the carbon electrode manufactured by use of the raw material composite of the present invention to the electric double layer capacitor, it is possible to sufficiently improve capacitance and energy density of the electric double layer capacitor.

Here, throughout this description, "the interlayer distance $d_{002}$ of the microcrystalline carbon determined by the X-ray diffraction method" and "the crystallite size $Lc_{002}$ of the microcrystalline carbon obtained by the X-ray diffraction method" represent data to be measured on the basis of graphite having the definite structure, in accordance with the following fact found out by the inventors.

Here, procedures for performing a structural analysis of a sample according to a powder X-ray diffraction method were carried out as described below in the present invention.

Specifically, sample powder (the raw material composite, the after-mentioned raw material carbon or the after-mentioned carbon material) is filled in a sample holder and an X-ray diffraction pattern is obtained by use of a CuK α line monochromated with a graphite monochromator. A peak position of this diffraction pattern is determined by the centroid method (the method of determining a centroidal position of a diffraction line and then determining a peak position with a 2θ value corresponding thereto) and corrected by use of a diffraction peak of a (111) plane of high-purity silicon powder as a standard substance.

Thereafter, the wavelength of the CuK α line is set to 0.15418 nm and the interlayer distance $d_{002}$ of the microcrystalline carbon is calculated by the Bragg formula expressed in the following formula (1). Then, existence of a graphite structure formed in the sample can be confirmed, for example, by the fact that the 2θ value has a conspicuous peak in the vicinity of 25° in the X-ray diffraction pattern of the sample powder.

$$d_{002} = \lambda/(2 \sin \theta) \quad (1)$$

That is, graphite has a multilayer structure composed of layers each having a planar network structure of so-called benzene ring shapes. In the measurement by the powder X-ray diffraction, a diffraction peak based on $C_{002}$ is observed as a sharply pointed peak (where 2θ is around 25°) at the interlayer distance $d_{002}$=0.335 nm. Meanwhile, the inventors have confirmed that a diffraction peak based on a graphite crystal (a diffraction peak based on $C_{002}$) was detected clearly (a diffraction peak was observed in high intensity as integrated intensity) in the vicinity of 2θ=25° in the raw material composite of the present invention although the peak was quite broad in comparison with graphite, and that $d_{002}$ determined therefrom was 0.343 nm or below.

Moreover, the inventors have confirmed that a diffraction peak based on a graphite crystal (a diffraction peak based on $C_{002}$) was detected clearly (observed in high intensity as integrated intensity) in the vicinity of 2θ=25° in the after-mentioned carbon material obtained by subjecting the raw material composite of the present invention to an activation treatment although the peak was quite broad in comparison with graphite, and that $d_{002}$ determined therefrom ranged from 0.360 nm to 0.380 nm. Furthermore, the inventors have confirmed that a diffraction peak based on a graphite crystal (a diffraction peak based on $C_{002}$) was detected clearly (observed in high intensity as the integrated intensity) in the vicinity of 2θ=25° in the after-mentioned raw material carbon used as a raw material for the raw material composite of the present invention although the peak was quite broad in comparison with graphite, and that $d_{002}$ determined therefrom ranged from 0.34 nm to 0.35 nm.

On the contrary, in activated carbon used in a conventional electric double layer condenser, a diffraction peak corresponding to $C_{002}$ was generally small and not detected clearly, and the interlayer distance $d_{002}$ calculated on the assumption of some existence reaches a very high value of 0.40 nm or more. In this way, when the interlayer distance $d_{002}$ reaches a very high value of 0.40 nm or more, it is not possible to obtain a sufficient performance out of the electric double layer capacitor.

From this point, it was confirmed that all of the raw material composite, the carbon material obtained by subjecting the raw material composite to the activation treatment as described later, and the raw material carbon used as the raw material for the raw material composite contained "the crystallite of the microcrystalline carbon similar to graphite". In addition, the inventors have found out that the crystallite size $Lc_{002}$ of the microcrystalline carbon similar to graphite, which was contained in the raw material composite of the present invention, was 3.0 nm or below.

Moreover, in this description, "the Hardgrove grindability index HGI defined by ASTMD-409-71" is a value obtained by crushing a given sample with a testing machine, sieving the sample with a given sieve, measuring the mass under the sieve, and then calculating the index by the following empirical formula (2):

$$HGI = 13 + 6.93 \times (\text{the mass under the sieve}) \quad (2)$$

In the raw material composite of the present invention, when this Hardgrove grindability index HGI defined by ASTMD-409-71 falls below 50, a space between carbon layers for forming an electric double layer does not spread in the step of activating the raw material composite later. Here, from the same viewpoint as described above, it is more preferable that the Hardgrove grindability index HGI defined by ASTMD-409-71 is set in a range from 50 to 80.

Meanwhile, in the raw material composite of the present invention, when the interlayer distance $d_{002}$ of the microcrystalline carbon determined by the X-ray diffraction method exceeds 0.343 nm, it is not possible to set the interlayer distance $d_{002}$ in the range from 0.36 to 0.38 nm in the step of activating the raw material composite later. Here, from the same viewpoint as described above, it is more preferable that the interlayer distance $d_{002}$ of the microcrystalline carbon is set in a range from 0.340 to 0.343 nm.

Moreover, in the raw material composite of the present invention, when the crystallite size $Lc_{002}$ of the microcrystalline carbon determined by the X-ray diffraction method exceeds 0.3 nm, it is not possible to obtain sufficient performance of the electric double layer capacitor. Here, from the same viewpoint as described above, it is more preferable that the crystallite size $Lc_{002}$ of the microcrystalline carbon is set in a range from 1.5 to 3.0.

Meanwhile, the present invention provides a method of manufacturing a raw material composite for a carbon material used in an electric double layer capacitor, the raw material composite containing microcrystalline carbon having a layered crystal structure similar to graphite and being formed into the carbon material for an electric double layer capacitor by undergoing an activation treatment. Here, the method of manufacturing a raw material composite for a carbon material used in an electric double layer capacitor includes: a raw material carbon preparation step of preparing raw material carbon containing the microcrystalline carbon having the layered crystal structure similar to graphite as a starting material; and a heat treatment step of heating the raw material carbon in an inert gas atmosphere in a temperature range from 600° C. to 900° C. and then cooling the raw material carbon down to 100° C. or below. Here, the raw material carbon used in the raw material carbon preparation step has an interlayer distance $d_{002}$ of the microcrystalline carbon determined by an X-ray diffraction method in a range from 0.34 to 0.35 nm, and integrated intensity of an X-ray diffraction peak corresponding to a 002 lattice plane equal to or more than 10% of graphite. Moreover, when an interlayer distance $d_{002}$ of the microcrystalline carbon is 0.337 nm or below, a crystallite size $La_{110}$ of the microcrystalline carbon is 80 nm or above in carbon obtained after heating at a temperature of 2800° C. in the inert gas atmosphere.

The raw material carbon satisfying the foregoing conditions has high graphitizability. Accordingly, it is possible to prepare the above-described raw material composite for a carbon material used in an electric double layer capacitor of the present invention easily and reliably by using the raw material carbon satisfying the foregoing conditions as the starting material and by heating and cooling the raw material carbon under the above-described conditions in the heat treatment step.

When the raw material carbon is heated in the range from 600° C. to 900° C. in the heat treatment step, rearrangement of the microcrystalline carbon proceeds as well as desorption of a volatile component from inside the raw material carbon proceeds. Accordingly, the interlayer distance $d_{002}$ of the microcrystalline carbon inside the obtained raw material composite becomes gradually smaller and reaches a minimum value.

In addition, under the heating conditions in this heat treatment step, the microcrystalline carbon contained in the raw material carbon does not grow large. In the meantime, a portion composed of carbon not formed into micro crystals inside the raw material carbon is rearranged by heating and is newly formed into the microcrystalline carbon. Accordingly, the crystallite size $Lc_{002}$ of the microcrystalline carbon contained in the obtained raw material composite becomes smaller as a whole and reaches the minimum value.

As a result, it is possible to obtain the raw material composite having the small interlayer distance $d_{002}$ equal to or less than 0.343 nm and the crystallite size $Lc_{002}$ of the microcrystalline carbon equal to or less than 3.0 nm. In other words, it is possible to obtain the raw material composite which has a large number of carbon layer planes of the microcrystalline carbon dominating in a unit capacity.

Moreover, in the raw material carbon, the Hardgrove grindability index HGI defined by ASTMD-409-71 becomes as weak as 50 or more by being heated in the temperature in the range from 600° C. to 900° C. in the heat treatment step. Moreover, thermal shock is applied to the raw material carbon in the course of heating in this temperature condition and subsequent cooling down to a temperature at 100° C. or below, and it is thereby possible to form fine cracks easily which satisfy a condition based on data to be measured by use of the after-mentioned mercury penetration method (see FIG. 1 to be described later).

Here, in this description, "the inert gas atmosphere" is an atmosphere outside the raw material carbon including gas such as inert gas or nitrogen gas as a main ingredient, which represents a chemically stable external atmosphere of the raw material carbon (especially an external atmosphere that is stable against an oxidation reaction).

Moreover, when the heating temperature falls below 600° C. in the heating treatment step, regarding the finally obtained raw material composite, the Hardgrove grindability index HGI defined by ASTMD-409-71 falls below 50, the interlayer distance $d_{002}$ exceeds 0.343 nm, and the crystallite size $Lc_{002}$ also exceeds 3.0 nm. Accordingly, it is not possible to obtain sufficient performance of the electric double layer capacitor. On the contrary, when the heating temperature exceeds 900° C. in the heating treatment step, regarding the raw material composite finally obtained in this case as well, the Hardgrove grindability index HGI defined by ASTMD-409-71 falls below 50, the interlayer distance $d_{002}$ exceeds 0.343 nm, and the crystallite size $Lc_{002}$ also exceeds 3.0 nm. Accordingly, it is not possible to obtain sufficient performance of the electric double layer capacitor.

Here, from the same viewpoint as described above, it is preferable that the heating temperature in the heat treatment step is set in a range from 700° C. to 800° C. In addition, when the cooling temperature in the heat treatment step exceeds 100° C., the fine cracks do not sufficiently develop in the finally obtained raw material composite.

Meanwhile, in this description, "the integrated intensity of the X-ray diffraction peak corresponding to the 002 lattice plane equal to or more than 10% of graphite" means that integrated intensity $I_1$ of an X-ray diffraction peak corresponding to a 002 lattice plane of the raw material carbon and integrated intensity $I_2$ of an X-ray diffraction peak corresponding to a 002 lattice plane of graphite satisfy a condition expressed by the following formula (3):

$$(I_1/I_2) \times 100 \geq 10 \quad (3)$$

In addition, the present invention provides an electric double layer capacitor including an anode and a cathode using carbon electrodes made of a carbon material containing microcrystalline carbon having a layered crystal structure similar to graphite as a main ingredient, in which the anode and the cathode are arranged through a medium of an electrolytic solution. Here, the carbon material is a material obtained by subjecting the above-described raw material composite of the present invention to an activation treatment, a specific surface area of the carbon material to be determined by a nitrogen gas absorption method is 300 m²/g or below, and an interlayer distance $d_{002}$ of the microcrystalline carbon of the carbon material is in a range from 0.360 to 0.380 nm.

In the above-described electric double layer capacitor of the present invention, each of carbon layer planes (the 002 lattice planes) of the microcrystalline carbon having the layered crystal structure similar to graphite, which is contained in the carbon material as the constituent material of the carbon electrodes, functions as an interface with the electrolytic solution formed in an electric double layer. Accordingly, the electric double layer capacitor possesses high capacitance and high energy density in spite of the small specific surface area equal to or less than 300 m²/g which is determined by the nitrogen gas absorption method.

Moreover, in the electric double layer capacitor of the present invention, the electric double layer to be formed on the carbon electrode is different from an electric double layer to be formed on a conventional carbon electrode using activated carbon having a pore structure with a large specific surface area to be determined by the nitrogen gas absorption method as a constituent material, in that the interface with the electrolytic solution constituting the electric double layer is each of the carbon layer planes (the 002 lattice planes) of the above-described microcrystalline carbon.

In other words, in the electric double layer capacitor of the present invention, the carbon electrode using the carbon material manufactured by use of the raw material composite of the present invention does not have pores, unlike the conventional carbon electrode using the activated carbon. Accordingly, although no electric double layers are virtually formed on the respective carbon layer planes described above at the beginning of formation of the electric double layer capacitor, electrolytic ions intrude into the respective carbon layers together with a solvent by applying an impressed voltage in excess of a given threshold to the carbon electrode upon an initial charge, and the electric double layers are thereby formed between all the carbon layer planes where the electrolytic ion intruded.

Here, in this description, the above-described intrusion of the electrolytic ions between the respective carbon layers together with the solvent will be hereinafter referred to as "solvent co-intercalation".

Then, such an interface functioning as the electric double layer formed between the respective carbon layers is retained by a hysteresis effect thereafter. As a result, the electric double layer capacitor of the present invention will possess high capacitance and high energy density. On the electric double layer to be formed between the respective carbon layers by the above-described solvent co-intercalation, a mechanism concerning the formation is disclosed, for example, in Mogami et al., Abstracts for the 3rd Research Conference 2000, Capacitor Technology Committee.

Moreover, in the present invention, "the specific surface area to be determined by the nitrogen gas absorption method" was measured by use of "Sorpty 1750" made by CARLO ERBA.

Here, in the electric double layer capacitor of the present invention, when the specific surface area of the carbon material to be determined by the nitrogen gas absorption method exceeds 300 $m^2/g$, it is not possible to obtain sufficient performance of the electric double layer capacitor compared to a case where the specific surface area does not exceed 300 $m^2/g$. Here, from the same viewpoint as described above, it is more preferable that the specific surface area of the carbon material to be determined by the nitrogen gas absorption method is set in a range from 30 to 250 $m^2/g$.

Meanwhile, in the electric double layer capacitor of the present invention, when the interlayer distance $d_{002}$ of the microcrystalline carbon of the carbon material falls below 0.360 nm, it is not possible to obtain sufficient performance of the electric double layer capacitor. On the contrary, when the interlayer distance $d_{002}$ of the microcrystalline carbon of the carbon material exceeds 0.380 nm, it is not possible to obtain sufficient performance of the electric double layer capacitor.

Moreover, the present invention provides a method of manufacturing an electric double layer capacitor including an anode and a cathode using carbon electrodes made of a carbon material containing microcrystalline carbon having a layered crystal structure similar to graphite as a main ingredient, in which the anode and the cathode are arranged through a medium of an electrolytic solution. Here, the method of manufacturing an electric double layer capacitor includes: a raw material carbon preparation step of preparing raw material carbon containing the microcrystalline carbon having the layered crystal structure similar to graphite as a starting material; a heat treatment step of heating the raw material carbon in an inert gas atmosphere in a temperature range from 600° C. to 900° C. and then cooling the raw material carbon down to 100° C. or below so as to obtain a raw material composite for the carbon material; and an activation treatment step of obtaining the carbon material by subjecting the raw composite for the carbon material to an activation treatment. Here, the raw material carbon used in the raw material carbon preparation step has an interlayer distance $d_{002}$ of the microcrystalline carbon determined by an X-ray diffraction method in a range from 0.34 to 0.35 nm, and integrated intensity of an X-ray diffraction peak corresponding to a 002 lattice plane equal to or more than 10% of graphite. Moreover, an interlayer distance $d_{002}$ of the microcrystalline carbon is 0.337 nm or below and a crystallite size $La_{110}$ of the microcrystalline carbon is 80 nm or above in carbon obtained after heating at a temperature of 2800° C. in the inert gas atmosphere.

As described above, it is possible to form the electric double layer capacitor having high capacitance and high energy density easily and reliably by manufacturing the raw material composite based on the above-described method of manufacturing a raw material for a carbon material used in an electric double layer capacitor of the present invention, then by subjecting the obtained raw material to the activation treatment to manufacture the carbon material, and then by using this carbon material as the constituent material for the carbon electrode.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
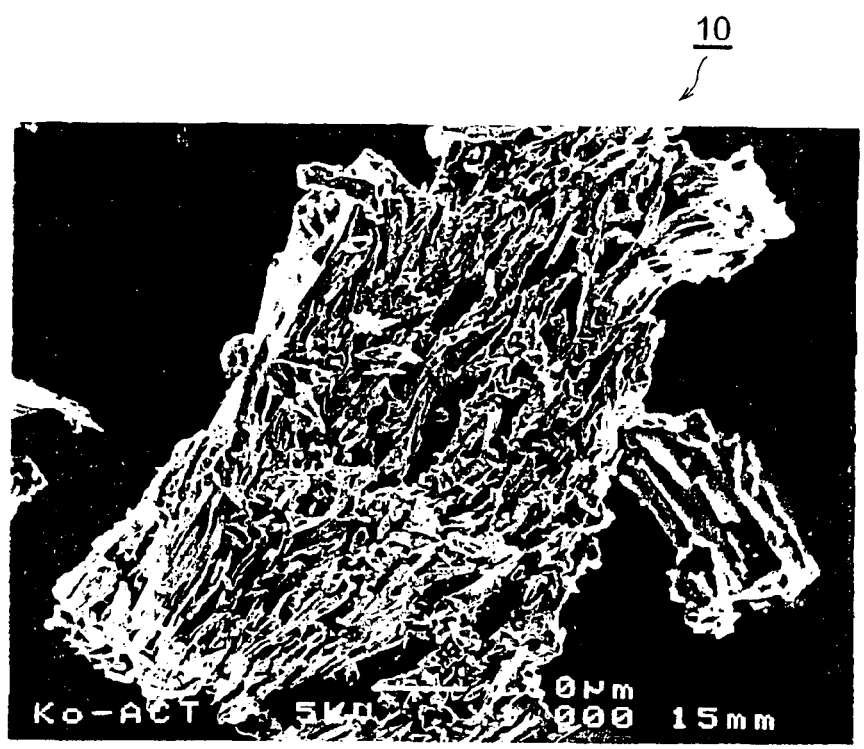
FIG. 1 is a view showing an SEM photograph of one example (Example 1) of a raw material composite for a carbon material used in an electric double layer capacitor of the present invention.

Now, preferred embodiments of the present invention will be described in detail.

As described previously, a raw material composite for a carbon material used in an electric double layer capacitor of the present invention is characterized in that a Hardgrove grindability index HGI defined by ASTMD-409-71 is 50 or more, an interlayer distance $d_{002}$ of microcrystalline carbon determined by an X-ray diffraction method is 0.343 nm or below, and a crystallite size $Lc_{002}$ of the microcrystalline carbon determined by the X-ray diffraction method is 3.0 nm or below.

According to the raw material composite of the present invention having a defined structure and physical properties which satisfy the foregoing conditions, it is possible to manufacture a carbon material easily, surely and at high reproducibility which satisfies a condition of a specific surface area (300 $m^2/g$ or below) to be determined by a nitrogen gas absorption method, and a condition of an interlayer distance $d_{002}$ (0.360 to 0.380 nm) of the microcrystalline carbon simultaneously. Moreover, by use of this carbon material as a constituent material for a carbon electrode, it is possible to sufficiently improve capacitance and energy density of an electric double layer capacitor.

Here, in the case where fine cracks are formed inside the raw material composite of the present invention and when a pore diameter and a pore capacity are determined by a mercury injection method on an assumption that the fine cracks are pores, it is preferable that the pore capacity of the fine cracks, which have sizes corresponding to pore diameters in a range from 0.1 to 10 μm, is in a range from 0.15 to 0.40 mL/g.

The fine cracks which satisfy the foregoing conditions can be also retained in a similar condition in the carbon material which is obtained after subjecting the raw material composite to an activation treatment. If the fine cracks are also formed in the carbon material after the activation treatment of the raw material composite as described above when configuring the electric double layer capacitor, the fine cracks serve as introduction holes for solvated electrolytic ions. Accordingly, the solvated electrolytic ions can intrude more uniformly and smoothly into layers of the microcrystalline carbon of the carbon material when solvent co-intercalation of the electrolytic ions occurs upon application of a voltage.

Here, in the raw material composite for the carbon material used in an electric double layer capacitor of the present invention, when the pore capacity of the fine cracks having the sizes corresponding to the pore diameters in the range from 0.1 to 10 μm falls below 0.15 mL/g, the fine cracks develop difficulty in sufficiently serving as the introduction holes upon the solvent co-intercalation. Accordingly, a sufficient increase in capacitance may become difficult. On the contrary, when the pore capacity of the fine cracks having the sizes corresponding to the pore diameters in the range from 0.1 to 10 μm exceeds 0.40 mL/g, the fine cracks exist excessively in the raw material composite, and bulk density of the raw material is thereby reduced. As a result, capacitance per unit capacity (volume) of the carbon material obtained from the raw material composite may be reduced.

FIG. 1 shows a scanning electron microscope (SEM) photograph of one example of a raw material composite for a carbon material used in an electric double layer capacitor of the present invention (a raw material composite shown in Example 1 to be described later). Here, conditions for SEM observation of a raw material 10 shown in FIG. 1 were set as primary electron beam power at 5 keV and a magnification of 1000 times (a micron bar in the SEM photograph represents 10 μm). Moreover, upon the SEM observation, no pretreatment such as sample coating took place.

As shown in FIG. 1, numerous fine cracks having the sizes corresponding to the pore diameters in the range from 0.1 to 10 μm are found to be formed in the raw material composite 10. The pore capacity of the fine cracks having the sizes corresponding to the pore diameters in the range from 0.1 to 10 μm in the raw material composite was 0.16 mL/g. Moreover, concerning the raw material composite 10 shown in FIG. 1, the Hardgrove grindability index HGI defined by ASTMD-409-71 was 75, the interlayer distance $d_{002}$ of the microcrystalline carbon determined by the X-ray diffraction method was 0.3407 nm, and the crystallite size $Lc_{002}$ of the microcrystalline carbon determined by the X-ray diffraction method was 2.2 nm.

Next, a preferred embodiment of a method of manufacturing a raw material composite for a carbon material used in an electric double layer capacitor of the present invention will be described.

As described previously, a method of manufacturing a raw material composite for a carbon material used in an electric double layer capacitor of the present invention includes: a raw material carbon preparation step of preparing raw material carbon containing the microcrystalline carbon having the layered crystal structure similar to graphite as a starting material; and a heat treatment step of heating the raw material carbon in an inert gas atmosphere in a temperature range from 600° C. to 900° C. and then cooling the raw material carbon down to 100° C. or below.

In the raw material carbon preparation step, as for the raw material carbon, prepared is a substance in which an interlayer distance $d_{002}$ of the microcrystalline carbon is in a range from 0.34 to 0.35 nm, and integrated intensity of an X-ray diffraction peak corresponding to a 002 lattice plane is equal to or more than 10% of graphite. Here, an interlayer distance $d_{002}$ of the microcrystalline carbon is 0.337 nm or below and a crystallite size $La_{110}$ of the microcrystalline carbon is 80 nm or above in carbon obtained after heating at a temperature of 2800° C. in the inert gas atmosphere.

Moreover, in the present invention, the raw material carbon satisfying the above-described conditions can be obtained by coking heavy hydrocarbon not containing impurity such as sulfur or metal but having moderate aromaticity under an appropriate condition. For example, the raw material carbon includes petroleum coke, infusibilized pitch, and the like.

Here, "the heavy hydrocarbon having moderate aromaticity" includes, for example, fluidized catalytic cracker bottom oil for petroleum heavy oil, residual oil of a vacuum distillation unit, aromatic compound tar, and the like. For example, petroleum coke as the raw material carbon can be obtained by subjecting such heavy hydrocarbon to a heat treatment under pressure with a delayed coker.

Such heavy hydrocarbon has high graphitizability, and a condensed polycyclic aromatic generated by a thermal decomposition reaction is layered and thereby formed into the raw material carbon containing the microcrystalline carbon having the layered crystal structure similar to graphite. Accordingly, the raw material obtained from the heavy hydrocarbon as described above also has high graphitizability. For this reason, it is possible to prepare the raw material composite for the carbon material used in the electric double layer capacitor of the present invention easily and reliably by using the raw material carbon satisfying the foregoing conditions as the starting material and subsequently by heating and cooling the raw material carbon in the heat treatment step.

In the heat treatment step for the raw material carbon, firstly the raw material carbon is heated in a range from 600° C. to 900° C. under the inert gas atmosphere. Under this heating condition, rearrangement of the microcrystalline carbon proceeds as well as desorption of a volatile component from inside the raw material carbon. Accordingly, the interlayer distance $d_{002}$ of the microcrystalline carbon inside the obtained raw material composite becomes gradually smaller and reaches a minimum value (in the range from 0.340 to 0.343 nm, for example) To be more precise, this interlayer distance $d_{002}$ of the microcrystalline carbon reaches the minimum value (about 0.34 nm) when the heating temperature is set to 750° C. in the heat treatment step.

Moreover, under the heating condition in this heat treatment step, the microcrystalline carbon contained in the raw material carbon does not grow large. In the meantime, a portion composed of carbon not formed into fine crystals inside the raw material carbon is rearranged by heating and is newly formed into the microcrystalline carbon. Accordingly, the crystallite size $Lc_{002}$ of the microcrystalline carbon in the obtained raw material composite becomes smaller as a whole and reaches a minimum value (in a range from 1.5 to 3.0 nm, for example). To be more precise, this crystallite size $Lc_{002}$ of the microcrystalline carbon in the obtained raw material composite reaches the minimum value (about 1.5 nm) when the heating temperature is set to 750° C. in the heat treatment step.

As a result, it is possible to obtain the raw material composite having the small interlayer distance $d_{002}$ equal to or less than 0.343 nm and the crystallite size $Lc_{002}$ of the microcrystalline carbon equal to or less than 3.0 nm. In other words, it is possible to obtain the raw material composite which has a large number of carbon layer planes of the microcrystalline carbon dominating in a unit capacity.

Moreover, in the raw material carbon, the Hardgrove grindability index HGI defined by ASTMD-409-71 becomes as weak as 50 or above by being heated in the temperature in the range from 600° C. to 900° C. in the heat treatment step. Moreover, thermal shock is applied to the raw material carbon in the course of heating in this temperature condition and subsequent cooling down to the temperature at 100° C. or below, and it is thereby possible to form fine cracks easily which satisfy a condition based on data to be measured by use of the mercury injection method which was described previously.

Here, in the method of manufacturing the raw material composite for the carbon material used in the electric double layer capacitor of the present invention, it is preferable that the raw material composite obtained after the heat treatment step is adjusted to have the Hardgrove grindability index HGI defined by ASTMD-409-71 equal to or more than 50, the interlayer distance $d_{002}$ of the microcrystalline carbon equal to or less than 0.343 nm, and the crystallite size $Lc_{002}$ of the microcrystalline carbon equal to or less than 3.0 nm.

To manufacture the raw material composite obtained after the heat treatment step so as to satisfy the foregoing conditions, it is essential to perform heating at the temperature in the range from 600° C. to 900° C. and then cooling down to 100° C. or below in the heat treatment step.

For example, the raw material composite shown in FIG. 1 can be manufactured based on the following procedures and conditions. Specifically, first, in the raw material carbon preparation step, used was carbon in which the interlayer distance $d_{002}$ of the microcrystalline carbon determined by the X-ray diffraction method was 0.3426 nm, and the integrated intensity of the X-ray diffraction peak corresponding to the 002 lattice plane was equal to 15% of graphite. Here, the carbon had the following characteristics that the interlayer distance $d_{002}$ of the microcrystalline carbon was 0.3361 nm and the crystallite size $La_{110}$ of the microcrystalline carbon was 80 nm or more in the carbon obtained after heating at the temperature of 2800° C. in the inert gas atmosphere.

Here, as for this raw material carbon, used was petroleum coke manufactured by a delayed coker applying fluidized catalytic cracker bottom oil for petroleum heavy oil or residual oil of a vacuum distillation unit as raw material oil.

Subsequently, in the heat treatment step, 500 g of the raw material carbon is heated in the inert gas atmosphere at the temperature of 750° C. for four hours and then cooled down to 40° C. Thus, it is possible to obtain the raw material composite.

Next, a preferred embodiment of an electric double layer capacitor of the present invention will be described.

As described previously, the electric double layer capacitor of the present invention includes an anode and a cathode using carbon electrodes, and adopts a configuration in which the anode and the cathode are arranged through a medium of an electrolytic solution. Moreover, the carbon material which is a constituting material for the carbon electrodes is a material obtained by subjecting the above-described raw material composite of the present invention to an activation treatment. Here, a specific surface area of this carbon material to be determined by a nitrogen gas absorption method is 300 $m^2/g$ or below, and the interlayer distance $d_{002}$ of the microcrystalline carbon is in the range from 0.360 to 0.380 nm.

In the above-described electric double layer capacitor of the present invention, each of carbon layer planes (the 002 lattice planes) of the microcrystalline carbon having the layered crystal structure similar to graphite, which is contained in the carbon material as the constituent material of the carbon electrodes, functions as an interface with the electrolytic solution formed in an electric double layer. Accordingly, the electric double layer capacitor possesses high capacitance and high energy density in spite of the small specific surface area equal to or less than 300 $m^2/g$ which is determined by the nitrogen gas absorption method.

Here, in the electric double layer capacitor of the present invention, fine cracks are formed inside the carbon material and when a pore diameter and a pore capacity are determined by a mercury injection method on an assumption that the fine cracks of the carbon material are pores, it is preferable that the pore capacity of the fine cracks of the carbon material, which have sizes corresponding to pore diameters in a range from 0.1 to 10 $\mu$m, is in a range from 0.15 to 0.40 mL/g.

As the fine cracks serve as introduction holes, the solvated electrolytic ions can intrude more uniformly and smoothly into layers of the microcrystalline carbon of the carbon material when the solvent co-intercalation of the electrolytic ions occurs upon application of a voltage.

When the pore capacity of the fine cracks having the sizes corresponding to the pore diameters in the range from 0.1 to 10 $\mu$m falls below 0.15 mL/g, the fine cracks develop difficulty in sufficiently serving as the introduction holes upon the solvent co-intercalation. Accordingly, a sufficient increase of capacitance may become difficult. On the contrary, when the pore capacity of the fine cracks having the sizes corresponding to the pore diameters in the range from 0.1 to 10 $\mu$m exceeds 0.40 mL/g, the fine cracks exist excessively in the raw material composite, and bulk density of the raw material is thereby reduced. As a result, capacitance per unit capacity (volume) of the carbon material obtained from the raw material composite may be reduced.

Meanwhile, the electrolytic solution for use in the electric double layer capacitor of the present invention is not particularly limited, and it is possible to apply a publicly known electrolytic solution used in an electric double layer capacitor. However, since an aqueous electrolytic solution has an electrochemically low decomposition voltage, it is preferable to apply an organic-solvent (non-aqueous) electrolytic solution.

Although the type of the electrolytic solution is not particularly limited, it is generally preferable that the electrolytic solution is selected in consideration of solute solubility, a degree of dissociation, and fluid viscosity, and has high conductivity and a wide potential window (a high decomposition starting voltage). As a typical example, a solution of a quaternary ammonium salt such as tetraethylammonium tetrafluoroborate in an organic solvent such as propylene carbonate, diethylene carbonate or acetonitrile is used. In this case, moisture contamination needs to be strictly controlled.

Moreover, the carbon electrode for used in the electric double layer capacitor of the present invention is not particularly limited in terms of other conditions (types and contents of the constituent materials other than the carbon material such as a binder, components of the electrode such as a charge collector, the shape of the electrode, and the like) as long as the carbon electrode contains the carbon material, which is obtained by subjecting the raw material composite of the present invention to the activation treatment, as the main ingredient of the constituent material.

Next, a method of manufacturing an electric double layer capacitor will be described. As described previously, the method of manufacturing an electric double layer capacitor of the present invention includes: a raw material carbon preparation step of preparing raw material carbon containing microcrystalline carbon having a layered crystal structure similar to graphite as a starting material; a heat treatment step of heating the raw material carbon in an inert gas atmosphere in a temperature range from 600° C. to 900° C. and then cooling the raw material carbon down to 100° C. or below so as to obtain a raw material composite for the carbon material; and an activation treatment step of obtaining the carbon material by subjecting the raw composite for the carbon material to an activation treatment.

In the raw material carbon preparation step, prepared is the raw material carbon which satisfies conditions similar to the conditions described in the raw material carbon preparation step in the above-described method of manufacturing a raw material composite for a carbon material used in an electric double layer capacitor of the present invention.

Meanwhile, in the heat treatment step, the raw material carbon is subjected to the heat treatment under conditions similar to the conditions described in the heat treatment step in the above-described method of manufacturing a raw material composite for a carbon material used in an electric double layer capacitor of the present invention so as to obtain the raw material composite.

Moreover, a reaction condition for an activation reaction in the activation step is not particularly limited as long as this reaction can proceed sufficiently, and it is possible to conduct the activation reaction under conditions similar to a publicly known activation reaction applied upon manufacture of normal activated carbon. For example, the activation reaction in the activation step can be performed by mixing caustic alkali with the raw material composite as adopted in the manufacture of normal activated carbon, and by heating under a high temperature condition preferably at 400° C. and above, more preferably at 600° C. and above, or even more preferably at 800° C. and above, which is performed in a manufacturing process of an ordinary activated carbon. Here, although a ceiling of this heating temperature is not particularly limited as long as the activation reaction proceeds without trouble, a temperature at 900° C. is normally preferred.

Meanwhile, the caustic alkali for use in the activation reaction in the activation step includes KOH, NaOH, RbOH, CsOH, and the like, for example. Alternatively, the caustic alkali may be a mixture of the above-mentioned caustic alkali (such as KOH and NaOH). Among these, KOH is preferred.

For example, the raw material composite is firstly mixed with the caustic alkali in a mass ratio equivalent to 1 to 4 times (e.g., about 2 times), and is heated again in the above-described temperature range (for example, about 800° C.) for the activation reaction under the inert gas atmosphere (such as a nitrogen gas atmosphere) for 1 to 6 hours (e.g., 4 hours), thus performing a treatment with the caustic alkali. Here, "the inert gas" includes nitrogen gas in addition to rare gas. Next, the residual alkali in the carbon material obtained after the treatment with the caustic alkali is removed by water (such as distilled water). Next, the carbon material is dried to remove water and the carbon material for the electric double layer capacitor is thereby obtained.

Here, the above-described method of removing the residual alkali is not particularly limited as long as the method can remove the alkali. However, cleaning with room-temperature or heated water (warm water), steam cleaning or the like is applied, for example. In addition to these removing methods, it is also possible to mix other methods including a neutralization method with an acid, an electrochemical treatment method such as an electrolytic treatment, an ultrasonic treatment method, and the like as appropriate.

However, it is preferable to perform water cleaning in the final stage when a plurality of treatment methods are combined as described above to remove the residual alkali. Such water cleaning is preferably continued until the pH of the drainage after the cleaning reaches 7 or thereabouts.

Meanwhile, the content of residual alkali in the carbon material is not particularly limited as long as the residual alkali remains in the amount lower than a level which may cause a trouble such as elution or exudation of alkali to the electrolytic solution. However, when the residual amount is expressed as the content of an alkali metal element (an alkali metal element constituting the residual alkali) contained in the carbon material after removing the residual alkali as much as possible, the content is preferably equal to or less than 3.0% by mass, or more preferably equal to or less than 2.0% by mass, or even more preferably equal to or less than 1.0% by mass. Here, the above-described content can be determined by applying an atomic absorption analysis.

Here, even if a heat treatment is conducted at a temperature higher than a boiling point of the alkali metal constituting the residual alkali, for example, so as to further remove the residual alkali after reducing the content of residual alkali remaining in the carbon material down to the preferable level as described above, it is normally difficult to further remove the residual alkali. The reason for this is assumed as follows: the alkali metal contained in the carbon material at the low concentration level as described above has already been bonded directly to carbon in the carbon material to form a compound such as a charge-transfer complex, and has already established a state of stable existence in the carbon material.

In this event, as described previously, the raw material composite of the present invention has the different structure from the conventionally used activated carbon. Accordingly, the activation reaction thereof proceeds differently from the normal activation reaction of the activated carbon.

Specifically, in the raw material composite of the present invention, the interlayer distance of $d_{002}$ of the microcrystalline carbon is as small as 0.343 nm or below and the crystallite size thereof is as small as 3.0 nm or below. Accordingly, in the case of direct alkali activation with potassium hydroxide, intrusion of potassium ions in potassium hydroxide into the layers of the microcrystalline carbon is suppressed and the potassium ions cannot intrude sufficiently. Therefore, it is not possible to spread spaces between the layers widely. In this way, the interlayer distance $d_{002}$ of the microcrystalline carbon of the carbon material obtained after the activation is set in a range from 0.360 to 0.380 nm, which is most suitable for the solvent co-intercalation of the electrolytic ions between the layers of the microcrystalline carbon upon initial voltage application when used as the carbon electrode for the electric double layer capacitor, and the specific surface area thereof is reduced to 300 m$^2$/g or below which is smaller than that of the conventional activated carbon.

On the contrary, when a material such as the raw material carbon described in this description, which has a large interlayer distance and a large crystallite size of the microcrystalline carbon, is subjected to direct alkali activation with potassium hydroxide instead of the raw material composite of the present invention, for example, the potassium ions in potassium hydroxide intrude sufficiently into the layers of the microcrystalline carbon to spread the spaces between the layers widely, whereby the spaces between the layers are changed to pores. After the activation, there will be obtained the conventional activated carbon having a large surface area equal to or more than 1000 m$^2$/g.

As describe above, it is possible to form the electric double layer capacitor having high capacitance and high energy density easily and reliably by manufacturing the raw material composite based on the above-described method of manufacturing a raw material composite for a carbon material used in an electric double layer capacitor of the present invention, then by subjecting the obtained raw material composite to the activation treatment to manufacture the carbon material, and then by using this carbon material as the constituent material for the carbon electrode.

Here, in the method of manufacturing an electric double layer capacitor of the present invention as well, it is preferable that the raw material composite obtained after the heat treatment step is adjusted to have the Hardgrove grindability index HGI defined by ASTMD-409-71 equal to or more than 50, the interlayer distance $d_{002}$ of the microcrystalline carbon equal to or less than 0.343 nm, and the crystallite size $Lc_{002}$ of the microcrystalline carbon equal to or less than 3.0 nm as similar to the above-described method of manufacturing a raw material composite for a carbon material used in an electric double layer capacitor of the present invention.

Meanwhile, in the method of manufacturing an electric double layer capacitor of the present invention, it is preferable that the specific surface area of the carbon material obtained after the activation treatment step to be determined by the nitrogen gas absorption method is 300 m$^2$/g or below, and that the interlayer distance $d_{002}$ of the microcrystalline carbon of the carbon material is in the range from 0.360 to 0.380 nm. Such a carbon material can be obtained by manufacturing the raw material composite based on the raw material carbon preparation step and the heat treatment step described above.

Moreover, in the method of manufacturing an electric double layer capacitor of the present invention, it is preferable that the fine cracks are formed inside the carbon material obtained after the activation treatment step, and that the pore capacity of the fine cracks of the carbon material having the sizes corresponding to the pore diameters in the range from 0.1 to 10 $\mu$m is in the range from 0.15 to 0.40 mL/g when the pore diameter and the pore capacity are determined by the mercury injection method on the assumption that the fine cracks of the carbon material are the pores.

The above-described carbon material can allow the solvent co-intercalation of the electrolytic ions between the layers of the microcrystalline carbon of the carbon material to proceed more smoothly. Therefore, it is possible to form an electric double layer having excellent capacitance more easily and reliably. Moreover, to manufacture the carbon material which satisfies the foregoing conditions, it is essential to perform heating at the temperature in the range from 600° C. to 900° C. and then cooling down to 100° C. or below in the heat treatment step.

Meanwhile, a method of manufacturing a carbon electrode using the above-described carbon material is not particularly limited. For example, it is possible to fabricate the carbon electrode in a method which is similar to a case of using conventional activated carbon. For example, when fabricating a sheet electrode, the carbon material is crushed down to a size range from about 5 to 100 $\mu$m and grain sizes are adjusted. Then, a conductive agent (such as carbon black) for imparting electric conductivity to the carbon powder and a bonding agent (polytetrafluoroethylene, hereinafter referred to as PTFE), for example, are added thereto for kneading. Then, the kneaded material is rolled and drawn into a sheet shape to manufacture the carbon electrode.

Here, in addition to the carbon black, it is possible to use powder graphite and the like as the above-described conductive agent. Meanwhile, in addition to PTFE, it is possible to use PVDF, PE, PP, and the like as the bonding agent. In this event, a compounding ratio of the non-porous carbon, the conductive agent (carbon black), and the bonding agent (PTFE) is set to 10 to 1:0.5 to 10:0.5 to 0.25, for example.

Moreover, to form the carbon electrode, it is essential that fine grains obtained by crushing the carbon material and the carbon black are distributed uniformly and entwined with PTFE fiber at substantially the same strength. Accordingly, it is essential to perform kneading sufficiently and to perform rolling and drawing generally lengthwise and crosswise in repeating fashion. When the mass of the carbon electrode in a dry state is divided by the nominal volume of the carbon electrode to represent a density, such a density of the obtained carbon electrode is preferably set in a range from 0.8 to 1.2 g/cm$^3$.

EXAMPLES

Now, the present invention will be described more concretely based on examples and comparative examples. However, it is to be noted that the present invention will not be limited to the following examples.

Example 1

(1) The Raw Material Carbon (The Raw Material Carbon Preparation Step)

Raw coke manufactured by a delayed coker using fluidized catalytic cracker bottom oil for petroleum heavy oil or residual oil of a vacuum distillation unit as raw material oil was used as the raw material carbon.

This raw material carbon contained the microcrystalline carbon having the layered crystal structure similar to graphite. The interlayer distance $d_{002}$ of a layer corresponding to the 002 lattice plane of the microcrystalline carbon by X-ray diffraction measurement was 0.3426 nm, and the integrated intensity of the X-ray diffraction peak corresponding to the 002 lattice plane was 15% of graphite.

Moreover, when this raw material carbon was heated at the temperature of 2800° C. in argon gas, the interlayer distance $d_{002}$ of the layer corresponding to the 002 lattice plane of the microcrystalline carbon contained in the carbon obtained after heating was 0.3361 nm, and the crystallite size $La_{110}$ of the microcrystalline carbon was 100 nm.

(2) The Raw Material Composite (The Heat Treatment Step)

The above-described raw material carbon was dried in a drier at 120° C. for four hours and was put into a container.

Then the raw material carbon was heated in a nitrogen gas flow at 750° C. for four hours. Thereafter, a raw material composite was obtained by cooling the raw material carbon down to 40° C.

This raw material composite contained the microcrystalline carbon having the layered crystal structure similar to graphite. The interlayer distance $d_{002}$ of the layer corresponding to the 002 lattice plane of the microcrystalline carbon by the X-ray diffraction measurement was 0.3407 nm, and the crystallite size $Lc_{002}$ thereof was 2.2 nm. Moreover, the Hardgrove grindability index HGI defined by ASTMD-409-71 of this raw material composite was 75.

Furthermore, when this raw material-composite was observed with an SEM, numerous fine cracks existed, similarly to the raw material composite 10 shown in FIG. 1. Accordingly, the pore diameter and the pore capacity were determined in accordance with the mercury injection method by use of a mercury porosimeter (Porosimeter 2000, made by CARLO ERBA) on the assumption that these fine cracks were pores. In this case, the pore capacity of the fine cracks having the sizes corresponding to the pore diameters in the range from 0.1 to 10 μm was 0.16 mL/g.

(3) The Activation Treatment of the Raw Material Composite (The Activation Treatment Step)

The above-described raw material composite was crushed by use of a crusher and formed into powder having the grain sized within 110 μm with a JIS sieve. Then, 20 parts by mass of fine-grain potassium hydroxide was added to 10 parts by mass of the raw material composite powder using a high-purity alumina crucible. The two substances were blended well and subjected to the activation treatment in the nitrogen gas flow at 800° C. for four hours.

The carbon material obtained after the activation treatment was set aside for cooling. The entire crucible was put into a beaker and the material inside the crucible was rinsed out with a plenty of water, whereby slurry of the carbon material in an alkaline fluid was obtained in the beaker.

Next, the above-described slurry was subjected to vacuum filtration by use of a glass filter (GA-100, made by ADVANTEC, thickness; 1 μm) and the carbon material remaining on a paper filter after filtration was collected in the beaker together with the paper filter. Then the carbon material was collected from the paper filter by hot air drying.

Subsequently, 10 g of the collected carbon material was filled in a stainless steel column (inside diameter; 40 mm, length; 25 cm). Next, steam cleaning was performed by sending distilled water into the stainless steel column while maintaining the temperature inside the stainless steel column at 150° C. Here, this steam cleaning was continued until the pH of the drainage discharged from the stainless steel column reached 7.0. Thereafter, the carbon material was dried at 200° C. and 0.1 Torr (10 Pa) for four hours by use of a heating vacuum drier, whereby the carbon material for an electric double layer capacitor was obtained.

This carbon material contained the microcrystalline carbon having the layered crystal structure similar to graphite. The interlayer distance $d_{002}$ of the layer corresponding to the 002 lattice plane of the microcrystalline carbon by X-ray diffraction measurement was 0.3629 nm, and the specific surface area determined by the nitrogen gas absorption method (the BET method) was 200 m$^2$/g.

Furthermore, when this raw material composite was observed with the SEM, numerous fine cracks existed. The pore diameter and the pore capacity were determined in accordance with the mercury injection method by use of the above-mentioned mercury porosimeter on the assumption that these fine cracks were the pores. In this case, the pore capacity of the fine cracks having the sizes corresponding to the pore diameters in the range from 0.1 to 10 μm was 0.21 mL/g.

(4) Fabrication of the Carbon Electrode

The above-described carbon material, carbon black (the conductive agent), and PTFE (the binder) were blended and kneaded so as to achieve the mass ratio of carbon material: carbon black: PTFE=100:10:5. Subsequently, a sheet with a thickness of 0.5 mm was fabricated by rolling with a hot roller. Next, a plurality of disks having a diameter of 20 mm were cut out of this sheet. Then, these disks were disposed in a vacuum desicator vacuumed to 5 to 10 Torr (3 to 10 Pa) at 250° C. and dried for four hours, whereby discoid carbon electrodes (polarizable electrodes) were obtained.

(5) Fabrication of the Electric Double Layer Capacitor

Two pieces of the above-described carbon electrodes (the polarizable electrodes) were prepared, and an aluminum foil was fitted to each of the two carbon electrodes as a charge collector inside a sufficiently dry glove box where a dew point was set to −85° C. or below. One of the carbon electrodes was used as an anode and the other was used as a cathode. Then, inside the glove box, a main body of the electric double layer capacitor having a configuration of disposing the anode and the cathode opposite to each other through a glass fiber separator was fabricated by use of a glass fiber separator (GA-100, made by ADVANTEC, thickness; 100 μm).

In the meantime, an electrolytic solution was prepared by dissolving tetraethylammonium tetrafluoroborate in propylene carbonate as a solvent so as to establish the content of 1 mol/L.

Next, the electric double layer capacitor main body was put into an airtight container made of aluminum, and both of the anode and the cathode were vacuum-impregnated with the above-described electrolytic solution. Thereafter, the electric double layer capacitor main body after vacuum-impregnating both of the anode and the cathode with the electrolytic solution was vacuum-packed in a plastic laminate bag, and the electric double layer capacitor is thereby fabricated. Here, the airtight container made of aluminum used herein was provided with an O ring at a lid portion so that the container could maintain sufficient airtightness.

Example 2

(1) The Raw Material Carbon (The Raw Material Carbon Preparation Step)

Raw coke manufactured by using fluidized catalytic cracker bottom oil for petroleum heavy oil as raw material oil and by coking this raw material oil with an autoclave heat treatment testing machine was used as the raw material carbon.

This raw material carbon contained the microcrystalline carbon having the layered crystal structure similar to graphite. The interlayer distance $d_{002}$ of a layer corresponding to the 002 lattice plane of the microcrystalline carbon by X-ray diffraction measurement was 0.3475 nm, and the integrated intensity of the X-ray diffraction peak corresponding to the 002 lattice plane was 12% of graphite.

Moreover, when this raw material carbon was heated at the temperature of 2800° C. in argon gas, the interlayer distance $d_{002}$ of the layer corresponding to the 002 lattice plane of the microcrystalline carbon contained in the carbon obtained after heating was 0.3363 nm, and the crystallite size $La_{110}$ of the microcrystalline carbon was 88 nm.

(2) The Raw Material Composite (The Heat Treatment Step)

The above-described raw material carbon was put into a container without drying at 120° C., unlike Example 1. Then the raw material carbon was heated in the nitrogen gas flow at 750° C. for four hours. Thereafter, a raw material composite was obtained by cooling the raw material carbon down to 40° C.

This raw material composite contained the microcrystalline carbon having the layered crystal structure similar to graphite. The interlayer distance $d_{002}$ of the layer corresponding to the 002 lattice plane of the microcrystalline carbon by the X-ray diffraction measurement was 0.3420 nm, and the crystallite size $Lc_{002}$ of the microcrystalline carbon was 2.6 nm. Moreover, the Hardgrove grindability index HGI defined by ASTMD-409-71 of this raw material composite was 80.

Furthermore, when this raw material composite was observed with the SEM, numerous fine cracks existed, similarly to Example 1. Accordingly, the pore diameter and the pore capacity were determined in accordance with the mercury injection method on the assumption that these fine cracks were pores. In this case, the pore capacity of the fine cracks having the sizes corresponding to the pore diameters in the range from 0.1 to 10 μm was 0.30 mL/g.

(3) The Activation Treatment of the Raw Material Composite (The Activation Treatment Step)

The carbon material for the electric double layer capacitor was obtained from the above-described raw material composite, similarly to Example 1.

This carbon material contained the microcrystalline carbon having the layered crystal structure similar to graphite. The interlayer distance $d_{002}$ of the layer corresponding to the 002 lattice plane of the microcrystalline carbon by X-ray diffraction measurement was 0.3781 nm, and the specific surface area determined by the nitrogen gas absorption method was 40 m$^2$/g.

Furthermore, when this raw material composite was observed with the SEM, numerous fine cracks existed. Accordingly, the pore diameter and the pore capacity were determined in accordance with the mercury injection method by use of the above-mentioned mercury porosimeter on the assumption that these fine cracks were the pores. In this case, the pore capacity of the fine cracks having the sizes corresponding to the pore diameters in the range from 0.1 to 10 μm was 0.37 mL/g.

(4) Fabrication of the Carbon Electrode

The discoid carbon electrodes (the polarizable electrodes) were fabricated from the above-described carbon material, similarly to Example 1.

(5) Fabrication of the Electric Double Layer Capacitor

The electric double layer capacitor using the above-described carbon electrodes as the anode and the cathode was fabricated similarly to Example 1.

Comparative Example 1

(1) The Raw Material

A coconut shell was used instead of the raw material carbon used in the above-described Examples 1 and 2.

No X-ray diffraction peak corresponding to the 002 lattice plane of the microcrystalline carbon by the X-ray diffraction measurement was observed in this coconut shell carbon.

Moreover, when this coconut shell was heated at the temperature of 2800° C. in argon gas, the X-ray diffraction peak corresponding to the 002 lattice plane of the microcrystalline carbon by the X-ray diffraction measurement was indistinct in the carbon obtained after heating. Moreover, the interlayer distance $d_{002}$ of the layer corresponding to the 002 lattice plane was determined to be 0.40 nm from the indistinct X-ray diffraction peak. Therefore, the crystallite size $La_{110}$ of the microcrystalline carbon was also indistinct.

From these points, it is conceivable that this coconut shell contains very little microcrystalline carbon having the layered crystal structure similar to graphite.

(2) The Coconut Shell Carbon

Using the above-described coconut shell as the raw material, this coconut shell was subjected to a carbonization treatment by a usual method at a temperature around 800° C., and the coconut shell carbon thus obtained was applied instead of the raw material composite used in the above-described Examples 1 and 2.

The X-ray diffraction peak corresponding to the 002 lattice plane of the microcrystalline carbon by the X-ray diffraction measurement was indistinct in this coconut shell carbon. Moreover, the interlayer distance $d_{002}$ of the layer corresponding to the 002 lattice plane was determined to be 0.40 nm from the indistinct X-ray diffraction peak. Therefore, the crystallite size $La_{110}$ of the microcrystalline carbon was also indistinct.

From these points, it is conceivable that this coconut shell carbon contains very little microcrystalline carbon having the layered crystal structure similar to graphite.

(3) The Activation Treatment of the Coconut Shell Carbon

The above-described coconut shell carbon was subjected to a water-steam activation treatment under conditions of 1200° C. in a non-oxidative inert gas atmosphere, whereby conventional activated carbon for a carbon material used in an electric double layer capacitor was obtained.

In this activated carbon, the interlayer distance $d_{002}$ of the layer corresponding to the 002 lattice plane of the microcrystalline carbon by X-ray diffraction measurement was 0.40 nm and more, and the specific surface area determined by the nitrogen gas absorption method was 1500 m$^2$/g.

Moreover, when this raw material composite was observed with the SEM, no fine cracks existed unlike those observed in the carbon materials of Examples 1 and 2. Instead, numerous pores are formed similarly to those observed in a carbon material. Accordingly, the pore diameter and the pore capacity were determined concerning these pores in accordance with the mercury injection method. In this case, the pore capacity of the fine cracks having the sizes corresponding to the pore diameters in the range from 0.1 to 10 μm was 0.45 mL/g.

(4) Fabrication of the Carbon Electrode

The discoid carbon electrodes (the polarizable electrodes) were fabricated from the above-described activated carbon similarly to Example 1.

(5) Fabrication of the Electric Double Layer Capacitor

The electric double layer capacitor using the above-described carbon electrodes as the anode and the cathode was fabricated similarly to Example 1.

Comparative Example 2

(1) The Raw Material Carbon

The raw material carbon similar to that of Example 1 was used as the raw material carbon.

(2) The Raw Material Composite

The above-described raw material carbon was directly used as a substitute for the raw material composite in Example 1 without subjecting the raw material carbon to the heat treatment as performed in Example 1.

This raw material carbon contained the microcrystalline carbon having the layered crystal structure similar to graphite. The interlayer distance $d_{002}$ of the layer corresponding to the 002 lattice plane of the microcrystalline carbon by the X-ray diffraction measurement was 0.3426 nm, and the crystallite size $Lc_{002}$ of the microcrystalline carbon was 3.5 nm. Moreover, the Hardgrove grindability index HGI defined by ASTMD-409-71 of this raw material composite was 45.

Furthermore, concerning this raw material composite, the pore diameter and the pore capacity were determined similarly to Example 1. In this case, the pore capacity of the fine cracks having the sizes corresponding to the pore diameters in the range from 0.1 to 10 μm was 0.03 mL/g.

(3) The Activation Treatment of the Raw Material Composite

The carbon material for the electric double layer capacitor was obtained from the above-described raw material carbon after the steps similar to "(3) the activation treatment of the raw material composite" in Example 1.

Concerning this carbon material, the interlayer distance $d_{002}$ of the layer corresponding to the 002 lattice plane of the microcrystalline carbon by X-ray diffraction measurement was 0.40 nm and above, and the specific surface area determined by the nitrogen gas absorption method was 2500 m$^2$/g.

Furthermore, when this carbon material was observed with the SEM, numerous fine cracks existed. Accordingly, the pore diameter and the pore capacity were determined in accordance with the mercury injection method on the assumption that these fine cracks were the pores. In this case, the pore capacity of the fine cracks having the sizes corresponding to the pore diameters in the range from 0.1 to 10 μm was 0.55 mL/g.

(4) Fabrication of the Carbon Electrode

The discoid carbon electrodes (the polarizable electrodes) were fabricated from the above-described carbon material similarly to Example 1.

(5) Fabrication of the Electric Double Layer Capacitor

The electric double layer capacitor using the above-described carbon electrodes as the anode and the cathode was fabricated similarly to Example 1.

Comparative Example 3

(1) The Raw Material Carbon

The raw material carbon similar to Example 1 was used as the raw material carbon.

(2) The Raw Material Composite

The above-described raw material carbon was dried in a drier at 120° C. for four hours and was put into a container. Then the raw material carbon was heated in a nitrogen gas flow at 1200° C. for four hours. Thereafter, a raw material composite was obtained by cooling the raw material carbon down to 40° C.

This raw material composite contained the microcrystalline carbon having the layered crystal structure similar to graphite. The interlayer distance $d_{002}$ of the layer corresponding to the 002 lattice plane of the microcrystalline carbon by the X-ray diffraction measurement was 0.3488 nm, and the crystallite size $Lc_{002}$ of the microcrystalline carbon was 4.0 nm. Moreover, the Hardgrove grindability index HGI defined by ASTMD-409-71 of this raw material composite was 30.

Furthermore, concerning this raw material composite, the pore diameter and the pore capacity were determined similarly to Example 1. In this case, the pore capacity of the fine cracks having the sizes corresponding to the pore diameters in the range from 0.1 to 10 μm was 0.09 mL/g.

(3) The Activation Treatment of the Raw Material Composite

The carbon material for the electric double layer capacitor was obtained from the above-described raw material carbon similarly to Example 1.

Concerning this carbon material, the interlayer distance $d_{002}$ of the layer corresponding to the 002 lattice plane of the microcrystalline carbon by X-ray diffraction measurement was 0.365 nm, and the specific surface area determined by the nitrogen gas absorption method was 20 m$^2$/g.

Furthermore, when this carbon material was observed with the SEM, numerous fine cracks existed. Accordingly, the pore diameter and the pore capacity were determined in accordance with the mercury penetration method on the assumption that these fine cracks were the pores. In this case, the pore capacity of the fine cracks having the sizes corresponding to the pore diameters in the range from 0.1 to 10 μm was 0.11 mL/g.

(4) Fabrication of the Carbon Electrode

The discoid carbon electrodes (the polarizable electrodes) were fabricated from the above-described carbon material, similarly to Example 1.

(5) Fabrication of the Electric Double Layer Capacitor

The electric double layer capacitor using the above-described carbon electrodes as the anode and the cathode was fabricated, similarly to Example 1.

Comparative Example 4

(1) The Carbon Material for the Electric Double Layer Capacitor

Commercially available activated carbon ("Kureha Chemical 1711", made by Kureha Chemical Industry) was used as the carbon material for the electric double layer capacitor.

Concerning this carbon material, the interlayer distance $d_{002}$ of the layer corresponding to the 002 lattice plane of the microcrystalline carbon by X-ray diffraction measurement was 0.3709 nm, and the specific surface area determined by the nitrogen gas absorption method was 2000 m$^2$/g.

Moreover, when this raw material composite was observed with the SEM, no fine cracks existed unlike those observed in the carbon material of Example 1. Accordingly, it was impossible to measure the pore capacity of the fine cracks by the mercury injection method.

(2) Fabrication of the Carbon Electrode

The discoid carbon electrodes (the polarizable electrodes) were fabricated from the above-described carbon material, similarly to Example 1.

(3) Fabrication of the Electric Double Layer Capacitor

The electric double layer capacitor using the above-described carbon electrodes as the anode and the cathode was fabricated, similarly to Example 1.

Comparative Example 5

(1) The Raw Material Carbon

Phenol resin was applied instead of the raw material carbon used in the above-described Example 1 and Example 2.

(2) The Raw Material Composite

The raw material carbon was directly used as a substitute for the raw material composite in Example 1 without subjecting the above-described phenol resin to the heat treatment as performed in Example 1.

(3) The Activation Treatment of the Phenol Resin

The carbon material for the electric double layer capacitor was obtained from the above-described phenol resin, similarly to "(3) the activation treatment of the raw material composite" in Example 1.

Concerning this carbon material, the interlayer distance $d_{002}$ of the layer corresponding to the 002 lattice plane of the microcrystalline carbon by X-ray diffraction measurement was 0.3685 nm, and the specific surface area determined by the nitrogen gas absorption method was 1800 m$^2$/g.

Moreover, when this raw material composite was observed with the SEM, no fine cracks existed unlike those observed in the carbon material of Example 1. Accordingly, it was impossible to measure the pore capacity of the fine cracks by the mercury injection method.

(4) Fabrication of the Carbon Electrode

The discoid carbon electrodes (the polarizable electrodes) were fabricated from the above-described carbon material, similarly to Example 1.

(5) Fabrication of the Electric Double Layer Capacitor

The electric double layer capacitor using the above-described carbon electrodes as the anode and the cathode was fabricated similarly to Example 1.

[Characteristics Evaluation Test of the Electric Double Layer Capacitors]

Capacitance and energy density of the electric double layer capacitors shown in Example 1, Example 2, and Comparative Examples 1 to 5 were measured.

A charge and discharge test system ("Model-CDT5-4", made by Power Systems, Co.) was applied for charge and discharge measurement. Firstly, a voltage increase along with accumulation of charges in each electric double layer capacitor was monitored while performing constant-current charging at 20 mA. After electric potential reached 3 V, the mode was shifted to constant-voltage charging (moderate charging). Here, a total charging time in this event (i.e., a charging time+a moderate charging time) depends on the capacitance of a cell. Then, constant-current discharge was performed at 10 mA and a final voltage was set to 0 V. Then, after a certain quiescent period (about 1 minute), charging was started again. The above-described series of operations was repeated for 10 times.

The capacitance was determined as follows. Specifically, total discharge energy [W·s] was determined from a discharge curve (a discharge voltage—discharge time) as time integration of discharge energy (the discharge voltage× current (=10 mA)), and the capacitance of an evaluated cell was determined by use of a relational expression of capacitance $[F]=2\times$ the total discharge energy $[W\cdot s]/$(a discharge starting voltage $[V])^2$. Then, a value obtained by dividing this capacitance by the volume of the both electrodes (the anode and the cathode) was defined as the capacitance per unit volume [F/mL].

The energy density was determined as follows. Specifically, a value obtained by dividing the above-described total discharge energy [W·s] by the volume of the both electrodes (the anode and the cathode) was defined as the energy density per unit volume [Ws/mL] (or the energy density [Wh/L]).

Table 1 shows the energy density and the capacitance of the respective electric double layer capacitors shown in the above-described Examples and Comparative Examples.

TABLE 1

| | | | | EXAMPLE 1 | EXAMPLE 2 | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|---|---|---|---|---|
| RAW MATERIAL CARBON | X-RAY DIFFRACTION CHARACTERISTIC | INTERLAYER DISTANCE $d_{002}$ | nm | 0.3426 | 0.3475 | — | 0.3426 | 0.3426 | — | — |
| | | INTEGRATED INTENSITY RATIO $d_{002}$ | % | 15 | 12 | — | 15 | 15 | — | — |
| | X-RAY DIFFRACTION CHARACTERISTIC AFTER HEATING AT 2800 C | INTERLAYER DISTANCE $d_{002}$ | nm | 0.3361 | 0.3363 | 0.40 OR MORE | 0.3361 | 0.3361 | — | — |
| | | CRYSTALLITE SIZE $La_{110}$ | nm | 100 | 88 | — | 100 | 100 | — | — |
| RAW MATERIAL COMPOSITE | X-RAY DIFFRACTION CHARACTERISTIC | INTERLAYER DISTANCE $d_{002}$ | nm | 0.3407 | 0.3420 | 0.40 OR MORE | 0.3426 | 0.3488 | — | — |
| | | CRYSTALLITE SIZE $Lc_{002}$ | nm | 2.2 | 2.6 | — | 3.5 | 4.0 | — | — |
| | HARDGROVE GRINDABILITY INDEX HGI | | | 75 | 80 | — | 45 | 30 | — | — |
| | PORE VOLUME | MERCURY POROSIMETER | mL/g | 0.16 | 0.30 | — | 0.03 | 0.09 | — | — |
| CARBON MATERIAL FOR CAPACITOR | X-RAY DIFFRACTION CHARACTERISTIC | INTERLAYER DISTANCE $d_{002}$ | nm | 0.3629 | 0.3781 | 0.40 OR MORE | 0.40 OR MORE | 0.365 | 0.3709 | 0.3685 |
| | SPECIFIC SURFACE AREA | BET NITROGEN GAS | m²/g | 200 | 40 | 1500 | 2500 | 20 | 2000 | 1800 |
| | PORE VOLUME | MERCURY POROSIMETER | mL/g | 0.21 | 0.37 | 0.45 | 0.55 | 0.11 | — | — |
| CAPACITOR PERFORMANCES | ENERGY DENSITY | | Wh/L | 44 | 43 | 15 | 16 | 12.5 | 16.2 | 18.3 |
| | CAPACITANCE | | F/mL | 35 | 34 | 15 | 16 | 10 | 16 | 18 |

As described above, according to the present invention, it is possible to provide a raw material composite for a carbon material used in an electric double layer capacitor and a manufacturing method thereof which can surely improve capacitance and energy density of the electric double layer capacitor. Moreover, by using this raw material composite, it is possible to provide an electric double layer capacitor having high capacitance and energy density, and a manufacturing method thereof.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A raw material composite for a carbon material used in an electric double layer capacitor containing microcrystalline carbon having a layered crystal structure similar to graphite, the raw material composite being formed into a carbon material for an electric double layer capacitor by undergoing an activation treatment,
  wherein a Hardgrove grindability index HGI defined by ASTMD-409-71 is 50 or above,
  an interlayer distance $d_{002}$ of the microcrystalline carbon determined by an X-ray diffraction method is 0.343 nm or below, and
  a crystallite size $Lc_{002}$ of the microcrystalline carbon determined by the X-ray diffraction method is 3.0 nm or below.

2. The raw material composite for a carbon material used in an electric double layer capacitor according to claim 1,
  wherein fine cracks are formed inside the raw material composite, and
  when a pore diameter and a pore capacity are determined by a mercury injection method on an assumption that the fine cracks are pores, the pore capacity of the fine cracks having sizes corresponding to pore diameters in a range from 0.1 to 10 μm is in a range from 0.15 to 0.40 mL/g.

3. An electric double layer capacitor including an anode and a cathode using carbon electrodes made of a carbon material containing microcrystalline carbon having a layered crystal structure similar to graphite as a main ingredient, the anode and the cathode being arranged through a medium of an electrolytic solution,
  wherein the carbon material is a material obtained by subjecting the raw material composite according to claim 1 to an activation treatment,
  a specific surface area of the carbon material to be determined by a nitrogen gas absorption method is 300 m$^2$/g or below, and
  an interlayer distance $d_{002}$ of the microcrystalline carbon of the carbon material is in a range from 0.360 to 0.380 nm.

4. The electric double layer capacitor according to claim 3,
  wherein fine cracks are formed inside the carbon material, and
  when a pore diameter and a pore capacity are determined by a mercury injection method on an assumption that the fine cracks of the carbon material are pores, the pore capacity of the fine cracks of the carbon material having sizes corresponding to pore diameters in a range from 0.1 to 10 μm is in a range from 0.15 to 0.40 mL/g.

5. A method of manufacturing a raw material composite for a carbon material used in an electric double layer capacitor, the raw material composite containing microcrystalline carbon having a layered crystal structure similar to graphite and being formed into the carbon material for an electric double layer capacitor by undergoing an activation treatment, the method of manufacturing a raw material composite for a carbon material used in an electric double layer capacitor comprising:
  a raw material carbon preparation step of preparing raw material carbon containing the microcrystalline carbon having the layered crystal structure similar to graphite as a starting material; and
  a heat treatment step of heating the raw material carbon in an inert gas atmosphere in a temperature range from 600° C. to 900° C. and then cooling the raw material carbon down to 100° C. or below,
  wherein the raw material carbon used in the raw material carbon preparation step has an interlayer distance $d_{002}$ of the microcrystalline carbon determined by an X-ray diffraction method in a range from 0.34 to 0.35 nm, integrated intensity of an X-ray diffraction peak corresponding to a 002 lattice plane equal to or more than 10% of graphite,
  an interlayer distance $d_{002}$ of the microcrystalline carbon is 0.337 nm or below and a crystallite size $La_{110}$ of the microcrystalline carbon is 80 nm or more in carbon obtained after heating at a temperature of 2800° C. in the inert gas atmosphere.

6. The method of manufacturing a raw material composite for a carbon material used in an electric double layer capacitor according to claim 5, wherein the raw material composite to be obtained after the heat treatment step is adjusted such that a Hardgrove grindability index HGI defined by ASTMD-409-71 is 50 or above, an interlayer distance $d_{002}$ of the microcrystalline carbon is 0.343 nm or below, and a crystallite size $Lc_{002}$ of the microcrystalline carbon is 3.0 nm or below.

7. A method of manufacturing an electric double layer capacitor including an anode and a cathode using carbon electrodes made of a carbon material containing microcrystalline carbon having a layered crystal structure similar to graphite as a main ingredient, the anode and the cathode being arranged through a medium of an electrolytic solution, the method of manufacturing an electric double layer capacitor comprising:
  a raw material carbon preparation step of preparing raw material carbon containing the microcrystalline carbon having the layered crystal structure similar to graphite as a starting material;
  a heat treatment step of heating the raw material carbon in an inert gas atmosphere in a temperature range from 600° C. to 900° C. and then cooling the raw material carbon down to 100° C. or below so as to obtain a raw material composite for the carbon material; and
  an activation treatment step of obtaining the carbon material by subjecting the raw composite for the carbon material to an activation treatment, wherein the raw material carbon used in the raw material carbon preparation step has an interlayer distance $d_{002}$ of the microcrystalline carbon determined by an X-ray diffraction method in a range from 0.34 to 0.35 nm, and integrated intensity of an X-ray diffraction peak corresponding to a 002 lattice plane equal to or more than 10% of graphite, and an interlayer distance $d_{002}$ of the microcrystalline carbon is 0.337 nm or below and a crystallite size $La_{110}$ of the microcrystalline carbon is 80 nm or above in carbon obtained after heating at a temperature of 2800° C. in the inert gas atmosphere.

8. The method of manufacturing an electric double layer capacitor according to claim 7, owherein the raw material composite to be obtained after the heat treatment step is adjusted such that a Hardgrove grindability index HGI defined by ASTMD-409-71 is 50 or above, an interlayer distance $d_{002}$ of the microcrystalline carbon is 0.343 nm or below, and a crystallite size $Lc_{002}$ of the microcrystalline carbon is 3.0 nm or below.

9. The method of manufacturing an electric double layer capacitor according to claim 7,
  wherein a specific surface area of the carbon material obtained after the activation treatment step to be determined by a nitrogen gas absorption method is 300 m$^2$/g or below, and
  an interlayer distance $d_{002}$ of the microcrystalline carbon of the carbon material is in a range from 0.360 to 0.380 nm.

10. The method of manufacturing an electric double layer capacitor according to claim 7, wherein fine cracks are formed inside the carbon material obtained after the activation treatment step, and when a pore diameter and a pore capacity are determined by a mercury injection method on an assumption that the fine cracks of the carbon material are pores, the pore capacity of the fine cracks of the carbon material having sizes corresponding to pore diameters in a range from 0.1 to 10 $\mu$m is in a range from 0.15 to 0.40 mL/g.

* * * * *

UNITED STATES PATENT AND TRADEMARK OFFICE
CERTIFICATE OF CORRECTION

PATENT NO. : 6,882,517 B2
DATED : April 19, 2005
INVENTOR(S) : Tamotsu Tano et al.

It is certified that error appears in the above-identified patent and that said Letters Patent is hereby corrected as shown below:

<u>Title page,</u>
Item [57], ABSTRACT,
Lines 9-10, "0.343 NM" should read -- 0.343 nm --.

<u>Column 26,</u>
Line 50, "owherein" should read -- wherein --.

Signed and Sealed this

Twelfth Day of July, 2005

JON W. DUDAS
*Director of the United States Patent and Trademark Office*